United States Patent Office 3,522,098
Patented July 28, 1970

3,522,098
FUEL CELLS WITH DEVICE FOR REDUCING
ELECTROLYTE SHORT-CIRCUIT CURRENTS
Ferdinand v. Sturm, Erlangen-Buchenbach, and Herbert
Cnobloch, Erlangen, Germany, assignors to Siemens
Aktiengesellschaft, a corporation of Germany
Filed June 20, 1967, Ser. No. 647,421
Claims priority, application Germany, June 22, 1966,
S 104,375
Int. Cl. H01m 27/00
U.S. Cl. 136—86          1 Claim

ABSTRACT OF THE DISCLOSURE

Method of reducing electrolyte short-circuit currents in batteries having a plurality of fuel cells connected electrically in series and traversed by electrolyte in parallel includes injecting gas periodically into the electrolyte before it is supplied to the fuel cells so as to form gas bubbles therein, whereby the cross section of the electrolyte stream at the location at which the bubbles are located is reduced and the electrical resistance of the electrolyte stream is thereby increased. Device for carrying out the foregoing method includes duct means for supplying electrolyte to a fuel cell battery, means for injecting gas periodically at a location of the duct means into the electrolyte traversing the duct means so as to form gas bubbles therein whereby the cross section of the electrolyte stream in said duct means at the location at which the bubbles are found is reduced and the electrical resistance of the electrolyte stream is thereby increased.

Figure 1:
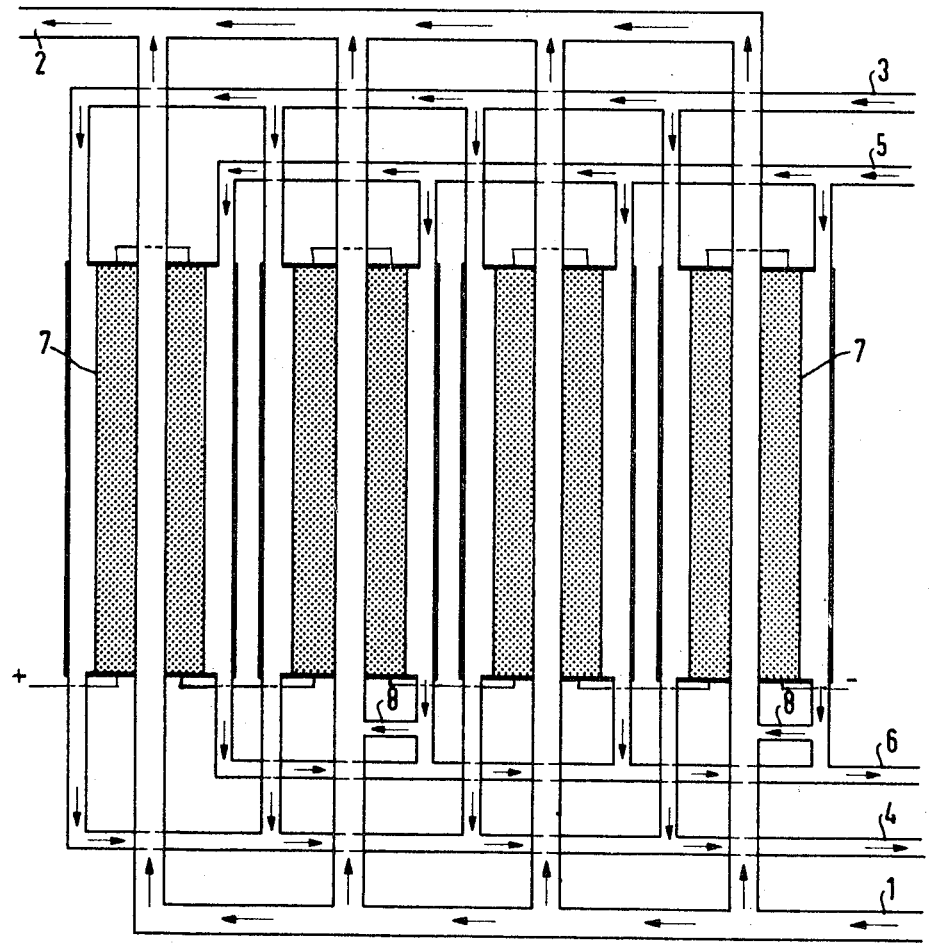

Our invention relates to method and device for reducing electrolyte short-circuit currents in fuel cell batteries, and more particularly in galvanic fuel cell batteries wherein the electrodes of the individual fuel cells are electrically connected in series and the electrolyte chambers of the individual cells are connected in parallel.

In fuel cell battery systems known heretofore, it is conventional to circulate the electrolyte by means of a pump. Heat produced when current is being drawn from the fuel cell is absorbed by the electrolyte and removed from the system. In conjunction with the circulation of the electrolyte, reaction products such as water, for example, formed during the electrochemical transformation occurring in the fuel cell, can be removed simultaneously; the concentration of electrolyte can thus be maintained at an optimal value.

It has been found that fuel cell batteries of the aforementioned, heretofore known, types have various disadvantages; thus, for example, the efficiency of the transformation of chemical to electrical energy is decreased by the formation of short-circuit currents in the electrolyte which can cause an increase in current losses and can produce electrolysis of the electrolyte resulting in undesired gas formation at the electrodes of the fuel cells.

The electrolyte short-circuit current I is produced in accordance with the equation:

$$I = \frac{U \cdot q}{l \cdot \rho}$$

in which U is the voltage, $l$ is the length and $q$ the cross section of the column of electrolyte and $\rho$ is the specific resistance of the electrolyte. Since $\rho$ is constant for a given electrolyte, a decrease in the short-circuit current can only be effected by increasing the length of the electrolyte flow path or by decreasing the cross section thereof or both.

Due to space limitations, an increase in the length of the flow path of the electrolyte must be considered to be of little suitability and narrowing of the electrolyte flow path is inexpedient because of the consequent increased current resistance which simultaneously necessitates the expenditure of a greater amount of power for circulating the electrolyte. If the diameter of the electrolyte flow path were reduced to about half of its previous diameter, the conductivity of the electrolyte and the consequent short-circuit current are then reduced to one-fourth of their previous values. The pumping power required for effecting circulation of the electrolyte increases, however, accordingly, to a value thirty times that of the original value.

It is accordingly an object of our invention to provide method and device for reducing electrolyte short-circuit currents in fuel cell batteries which avoid the aforementioned disadvantages of heretofore known devices seeking to effect such reduction.

With the foregoing and other objects in view we provide in accordance with our invention, method of reducing electrolyte short-circuit currents in batteries having a plurality of fuel cells connected electrically in series and traversed by electrolyte in parallel, which comprises injecting gas periodically into the electrolyte before it is supplied to the fuel cells so as to form gas bubbles therein, whereby the cross section of the electrolyte stream at the location at which the bubbles are found is reduced and the electrical resistance of the electrolyte stream is thereby increased.

We also provide, in accordance with the invention, apparatus for carrying out the foregoing method comprising duct means for supplying electrolyte to a fuel cell battery, means for injecting gas periodically at a location of the duct means into the electrolyte traversing the duct means so as to form gas bubbles therein whereby the cross section of the electrolyte stream in said duct means at the location at which the bubbles are found is reduced and the electrical resistance of the electrolyte stream is thereby increased.

One of the reaction gases, such as hydrogen, oxygen, carbon dioxide or alcohol, for example, or an inert gas can be used in the method and apparatus of our invention.

Other features which are considered as characteristic for the invention are set forth in the appended claim.

Although the invention is illustrated and described herein as method and apparatus for reducing electrolyte short-circuit currents in fuel cell batteries, it is nevertheless not intended to be limited to the details shown, since various modifications and structural changes may be made therein without departing from the spirit of the invention and within the scope and range of equivalents of the claim.

Figure 2:
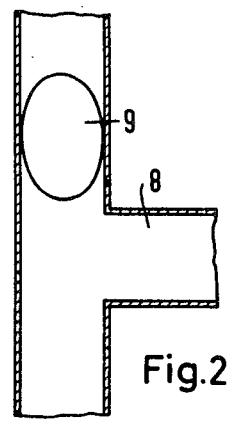

The construction and method of operation of the invention, however, together with additional objects and advantages thereof, will be best understood from the following description of a specific embodiment, when read in connection with the accompanying drawing, in which:

FIG. 1 is a schematic view of an arrangement of fuel cells in accordance with our invention; and FIG. 2 is a cross-sectional fragmentary view of part of the system of FIG. 1, much enlarged to show the gas-injection location.

Referring now to the drawing, and first particularly to FIG. 1 thereof, there is shown a system or battery of fuel cells wherein potassium hydroxide (KOH) is used as electrolyte and hydrogen and oxygen are used as reaction gas. The electrolyte enters the fuel cell battery through a duct 1, traverses the fuel cells provided with serially connected electrodes 7, and discharges therefrom through a duct 2. Hydrogen enters the battery through a duct 3, and discharges from the battery through a duct 4. Oxygen flows into the battery through a duct 5 and discharges therefrom through a duct 6. The duct 1 has branching ducts, each respectively connecting with a space in one of the fuel cells of the battery located between the electrodes thereof and further connecting with the outlet duct 2, so that the electrolyte passes in parallel through the fuel cells. Similarly, the duct 3 has branches, each of which passes through a chamber on one side of an electrode of each of the fuel cells, all of the branches merging in the discharge duct 4, so that the hydrogen gas also flows in parallel through the cells of the battery. The duct 5 also has branches passing through a chamber in each of the fuel cells on the outside of the second electrode in each of those cells, the branches meeting and connected with the outlet duct 6, so that the oxygen also flows in parallel through the fuel cells of the battery. A cross connection 8 is located between the branch of the oxygen duct 5 and the respective branch of the electrolyte supply duct 1 for each alternate fuel cell of the battery of aligned cells, through which oxygen is periodically blown into the electrolyte circuit. The cross section of the cross-connecting duct 8 is predetermined so that by adjusting the pressure of the oxygen, the necessary quantity of gas can be diverted or tapped from the respective branch of the supply line 5.

In the enlarged cross sectional view of FIG. 2, there is shown a gas bubble 9 formed by gas injected through the cross-connecting duct 8 into the electrolyte in a branch of the duct 1, the bubble 9 extending across the entire cross section of the branch of the duct 1. The connection between the electrolyte in the branch of the duct 1 on one side of the bubble 9 with the electrolyte on the other side thereof is formed by a thin, non-illustrated film of electrolyte extending along the wall of the branching duct adjacent the bubble 9. The short-circuit current produced is small. The gas bubble 9 moves in the direction of the circulating electrolyte through the respective branch of the duct 1 and discharges finally from the battery through the duct 2 whereby it again provides a narrowing of the electrolyte stream causing an increase in the resistance and therewith a reduction in the electrolyte short-circuit current also in the discharge duct 2 of the electrolyte.

During periods when no circulation of the electrolyte takes place through the duct system 1, 2, the gas bubbles remain in the ducts 1, 2, and further supply of gas to the duct system 1, 2 can be dispensed with.

By reducing the pressure of the oxygen gas, the supply of the gas through the connecting duct 8 to the electrolyte can be stopped. This is particularly the case when the battery is not subjected to a load. The gas consumption taking place during a state of rest when employing the method and device of our invention, is minimal due to the absence of leakage of current, which has an especially advantageous effect for such batteries which remain without load for long periods, for example, demand current supply units.

Following is an example of the method of our invention:

An electrolyte (6 m. KOH) was pumped in parallel through the cells of a conventional fuel cell battery having 34 successively connected cells. Hydrogen and oxygen were used as the reaction gas. The short circuit current was found to be 1.5 amperes, the power loss 30 watts. In accordance with our invention, a cross-connecting duct 8 was then provided between the oxygen branching duct and the electrolyte duct for each alternate cell of the same battery in the manner shown in FIG. 1 and, upon the injection of the oxygen into the electrolyte flow circuits, the short-circuit current was decreased to 0.2 ampere and the power loss was reduced to 5 watts.

We claim:
1. Device for reducing electrolyte short-circuit currents in batteries having a plurality of fuel cells connected electrically in series and traversible by electrolyte in parallel, comprising duct means for supplying electrolyte to a fuel cell battery, and means for injecting gas periodically at a location of said duct means into an electrolyte stream traversing said duct means so as to form gas bubbles therein, whereby the cross section of the electrolyte stream in said duct means at the location of said bubbles is reduced and the electrical resistance of said electrolyte stream is thereby increased, said electrolyte duct means comprising a plurality of branch ducts connecting the fuel cells in parallel, and including reaction gas supply duct means comprising a plurality of branch gas supply ducts connecting the fuel cells in parallel, said gas injecting means comprising connecting ducts respectively interconnecting the branch gas supply duct with the branch electrolyte duct of alternately disposed fuel cells of the battery.

References Cited

UNITED STATES PATENTS

| 2,925,455 | 2/1960  | Eidensohn et al. | 136—86 |
| 3,080,442 | 3/1963  | Hobert           | 136—86 |
| 3,215,562 | 11/1965 | Hindin           | 136—86 |
| 3,256,116 | 6/1966  | Justi et al.     | 136—86 |
| 3,375,139 | 3/1968  | Tschinpel et al. | 136—86 |

FOREIGN PATENTS 206,350  1/1909  Germany.

ALLEN B. CURTIS, Primary Examiner